(12) United States Patent
Dopfert et al.

(10) Patent No.: US 8,579,098 B2
(45) Date of Patent: Nov. 12, 2013

(54) PARKING LOCK DEVICE FOR AN AUTOMATIC TRANSMISSION OF A MOTOR VEHICLE

(75) Inventors: Hagen Dopfert, Lindau (DE); Matthias List, Friedrichshafen (DE)

(73) Assignee: ZF Friedrichshafen AG, Freidrichshafen (DE)

( * ) Notice: Subject to any disclaimer, the term of this patent is extended or adjusted under 35 U.S.C. 154(b) by 331 days.

(21) Appl. No.: 13/089,481

(22) Filed: Apr. 19, 2011

(65) Prior Publication Data
US 2011/0278132 A1 Nov. 17, 2011

(30) Foreign Application Priority Data

May 12, 2010 (DE) .......................... 10 2010 028 934
Nov. 3, 2010 (DE) .......................... 10 2010 043 260

(51) Int. Cl.
*F16H 63/38* (2006.01)
(52) U.S. Cl.
USPC ..................................... 192/219.5; 192/113.1
(58) Field of Classification Search
USPC ...................................................... 192/219.5
See application file for complete search history.

(56) References Cited

U.S. PATENT DOCUMENTS 5,685,406 A 11/1997 Crum et al.
2007/0062780 A1* 3/2007 Kusamoto et al. ......... 192/219.5

FOREIGN PATENT DOCUMENTS

DE        199 33 618 A1    1/2001
DE        10 245 951 A1    4/2004
DE    10 2008 036 971 B3   10/2009

* cited by examiner

*Primary Examiner* — Rodney Bonck
(74) *Attorney, Agent, or Firm* — Davis & Bujold, PLLC; Michael J. Bujold

(57) ABSTRACT

A parking lock device (1) for an automatic transmission of a motor vehicle. The parking lock device (1) comprises a locking pawl (3) that is fixed to the transmission housing and mounted so that the locking pawl (3) can pivot. The parking lock device (1) has a guiding element (3*b*) and a guide plate (5) fixed to and supported by the housing in which the guide element (3*b*) of the locking pawl (3) is guided laterally. One of a low-friction supporting element (7, 8) and an electrically insulating supporting element in a form of an insulating body (107) laterally guides the locking pawl (3).

20 Claims, 5 Drawing Sheets

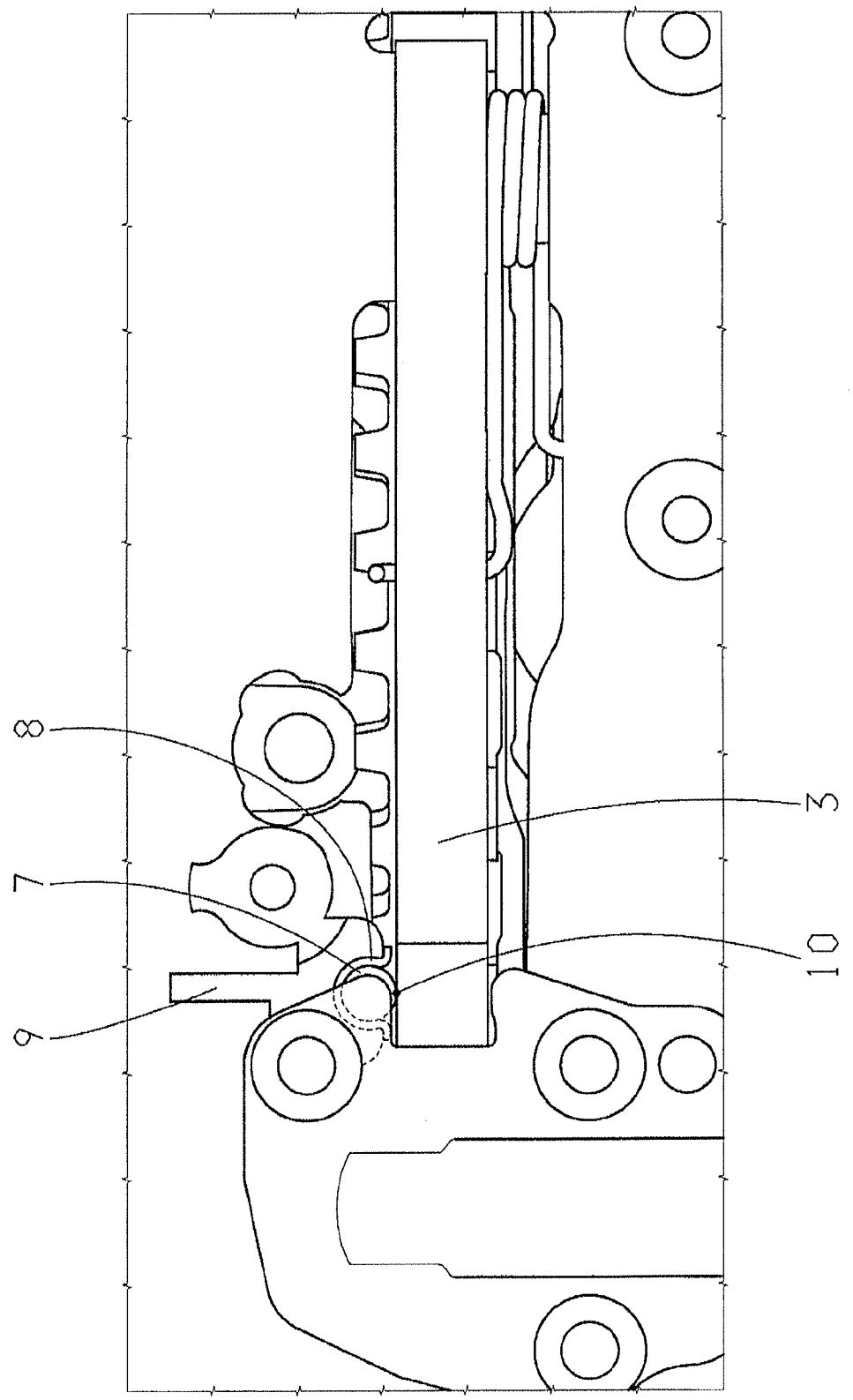

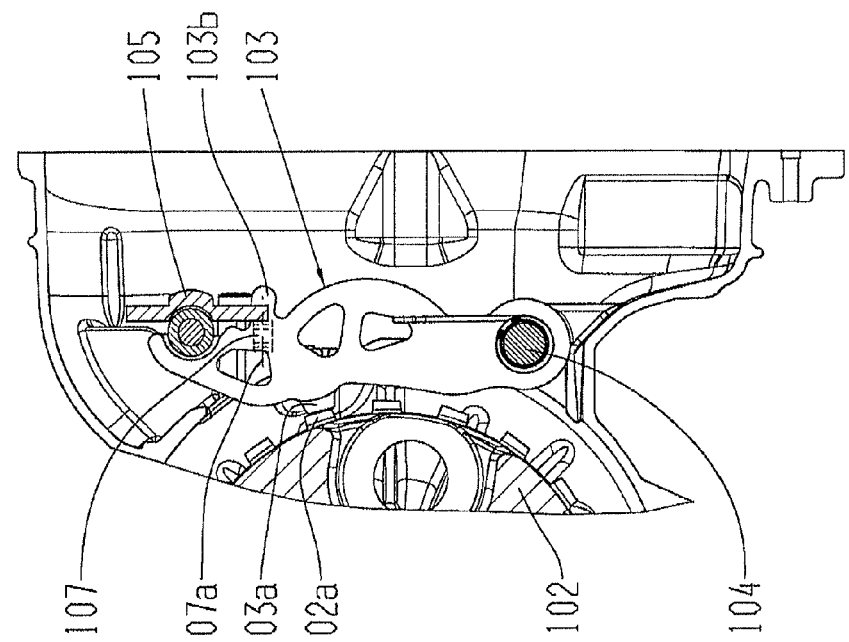
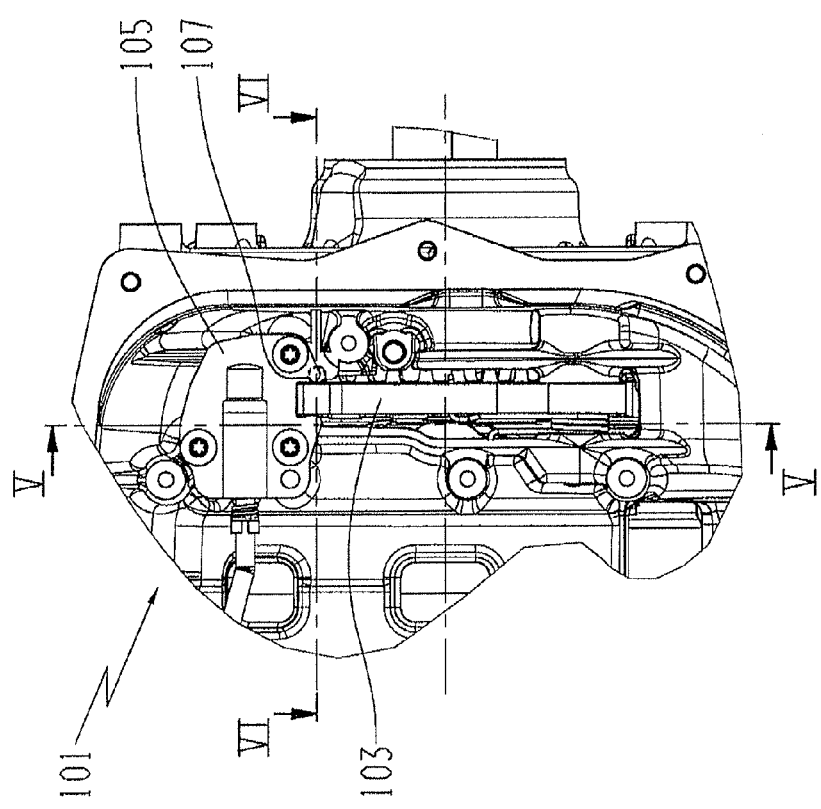

PARKING LOCK DEVICE FOR AN AUTOMATIC TRANSMISSION OF A MOTOR VEHICLE

This application claims priority from German patent application serial nos. 10 2010 028 934.5 filed May 12, 2010 and 10 2010 043 260.1 filed Nov. 3, 2010.

FIELD OF THE INVENTION

The invention concerns a parking lock device for an automatic transmission of a motor vehicle.

BACKGROUND OF THE INVENTION

From DE 199 33 618 A1 by the present applicant a parking lock device for an automatic transmission is known, in which when the parking lock is engaged a locking pawl that is pivotally mounted within a transmission housing engages in a parking lock gearwheel and blocks it. In this case the locking pawl is supported by means of a locking detent, relative to a guide plate which is part of a locking mechanism. When the parking lock is engaged the locking detent exerts a transverse force on the locking pawl, which is directed parallel to the axis of the parking lock bolt (pivot axis of the locking pawl). Under the action of this transverse force, the locking pawl is held against the guide plate, whereby friction forces are produced which hold up the movement of the locking pawl.

From U.S. Pat. No. 5,685,406 it is known to use rollers for reducing the friction between a locking pawl and a moving locking element. The known locking element is in the form of a locking roller arrangement which comprises a pair of rollers, one of which rests against the locking pawl and the other against an abutment fixed on the housing. In this way, when the parking lock is engaged, by virtue of rolling friction a smaller transverse force is exerted on the locking pawl. Thus, as its locking element this known device has no locking detent, but instead a locking roller.

Another problem that can arise in vehicles is that leakage currents can occur between the engine block, the starter and the transmission, which in unfavorable situations, for example if contact takes place between the locking pawl and the guide plate or the transmission housing, can lead to spark formation.

SUMMARY OF THE INVENTION

The purpose of the present invention, based on a parking lock device of the type mentioned at the start, is to increase safety when engaging the parking lock.

According to the invention, it is provided that the locking pawl is guided laterally by a low-friction supporting element. This has the advantage that when the parking lock is engaged, the friction between the locking pawl and the guide plate is reduced considerably. Particularly after a tooth-on-tooth position the locking pawl can fall more rapidly into engagement with the parking lock gearwheel since there is no, or only a considerably reduced friction-force-related delay. This increases safety when the parking lock is engaged.

According to another aspect of the invention the supporting element is in the form of an electrically insulating element or body, i.e. an electrically non-conducting or poorly-conducting intermediate element between the locking pawl and the guide plate and housing. This has the advantage that if there is a charge difference between the locking pawl and the transmission housing, no charge equalization by current flow can take place so that damage to the materials present, which for example can be caused by sparking, is avoided. This too increases safety when the parking lock is engaged. The supporting element thus has either a friction-reducing function, or an electrically insulating function, or both functions at the same time.

In further preferred embodiments the insulating body can consist completely of a ceramic material, or completely of a plastic material—in particular a Duroplast such as PEEK or TORLON—or it may consist of a main body with an electrically insulating coating which can at the same time have a friction-reducing action.

In a preferred embodiment the supporting element is in the form of at least one rolling body, preferably at least one ball. This has the advantage that friction is particularly low, i.e. rolling friction, which is substantially less than static or sliding friction between steel and steel. The rolling body can also be an insulator and will then again have two functions, namely to reduce friction and to ensure electrical insulation.

In a further preferred embodiment cylindrical rollers can also be used as the rolling element, and due to their linear contact these have higher load-bearing capacity than balls. The at least one rolling body can also be barrel-shaped, with rounded ends.

According to another preferred embodiment the at least one rolling body is guided in a cage, in particular a sleeve, such that the cage or sleeve is fixed and/or supported on the guide plate and/or the housing. In this way the low-friction and/or electrically insulating supporting element can be made in a simply designed manner.

In a further preferred embodiment, in the area of its guiding element, i.e. preferably in the area of the pawl hook, the locking pawl is guided by the supporting element. In such a design the locking pawl is supported laterally at its outermost end remote from the parking lock bolt, and this results in the lowest reaction force and hence the lowest friction.

In further preferred embodiments the insulating body can be cylindrical or barrel-shaped. This results, respectively, in linear contact or point contact with the locking pawl. However, contact over an area is also possible.

According to another preferred embodiment the insulating body is arranged in a niche of the transmission housing and on the guide plate. Thus, the insulating body is sufficiently well fixed and a longitudinal slot provides a "contact window" for the locking pawl.

BRIEF DESCRIPTION OF THE DRAWINGS

An example embodiment of the invention is illustrated in the drawing and described in more detail below, whereas further features and/or advantages emerge from the description and the drawing, which shows:

FIG. 3: a view of the locking pawl, seen from beneath, FIG. 4: another example embodiment of the invention, with a supporting element in the form of an insulating body, FIG. 5: a section along the plane V-V in FIG. 4, and FIG. 6: a section along the plane VI-VI in FIG. 4.

DETAILED DESCRIPTION OF THE PREFERRED EMBODIMENTS

Figure 1:
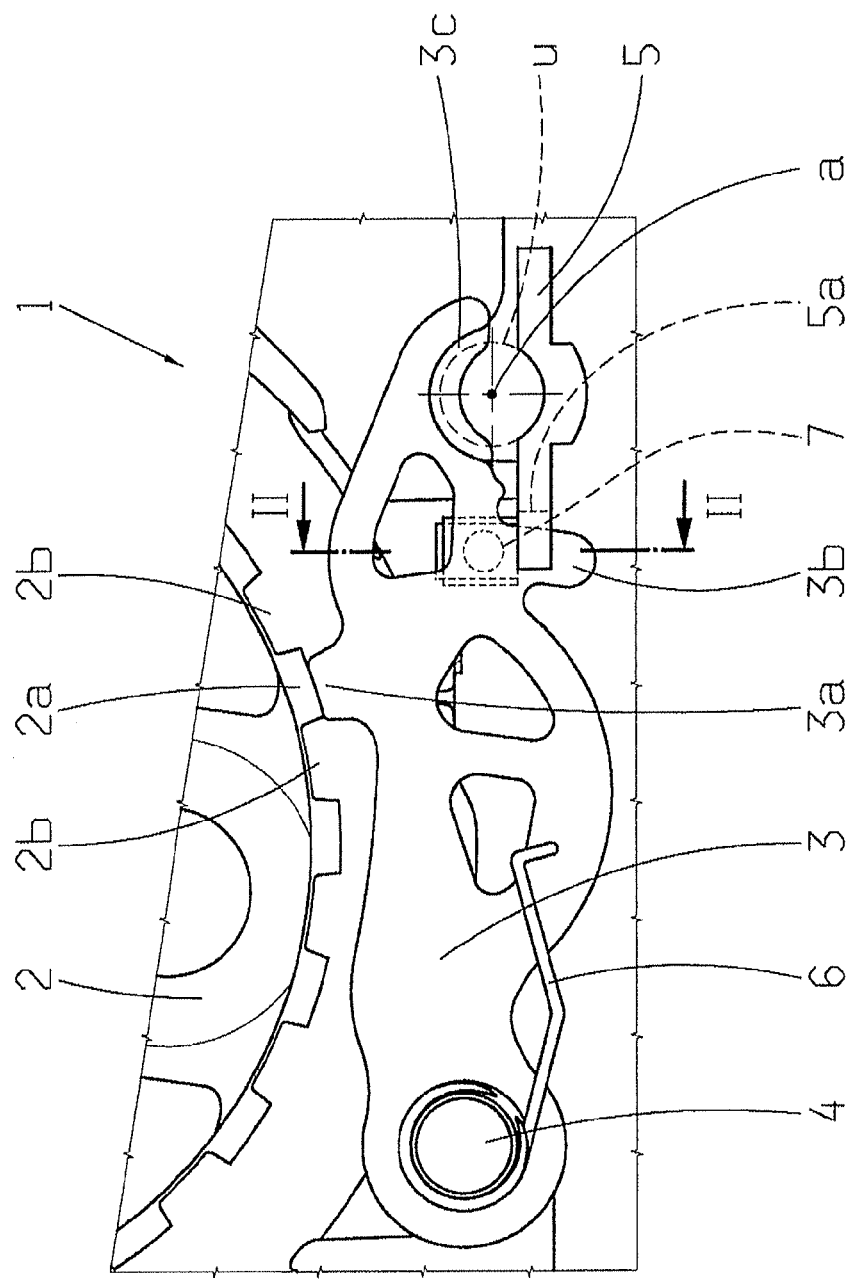
FIG. 1: a view of a parking lock device with locking pawl and parking lock gearwheel.

FIG. 1 shows a parking lock device 1 for an automatic transmission (not shown) of a motor vehicle, in which a parking lock gearwheel 2 (shown in part) and a locking pawl 3 mounted to pivot on a parking lock bolt 4 fixed to a housing are represented. The locking pawl 3 comprises a pawl tooth 3a, a pawl hook 3b and a curved supporting surface 3c for a locking detent, which is indicated by a dashed circular circumference-line u and an axis a. The parking lock device 1 also comprises a guide plate 5 which is supported on the housing and comprises a guide slot 5a in the area of the pawl hook 3b. The locking pawl 3 is acted upon by a lever spring 6 which functions as a restoring spring. The parking lock gearwheel 2 has a tooth array with teeth 2a and tooth gaps 2b between them. The illustration shows the locking pawl 3 and the parking lock gearwheel 2 in a so-termed tooth-on-tooth position, i.e. the tooth 3a of the locking pawl 3 is in tooth-crown contact with the tooth 2a of the parking lock tooth array, so that the locking pawl 3 is pressed against the tooth 2a of the parking lock gearwheel 2 by the locking detent u, which is supported on the guide plate 5. The parking lock can only be properly engaged when the tooth 2a moves out of the way so that a tooth gap 2b is exposed.

In the area of the pawl hook 3b, above the guide plate 5 a rolling body in the form of a ball 7 is shown by a broken line, the function of which is described in more detail below.

Figure 2:
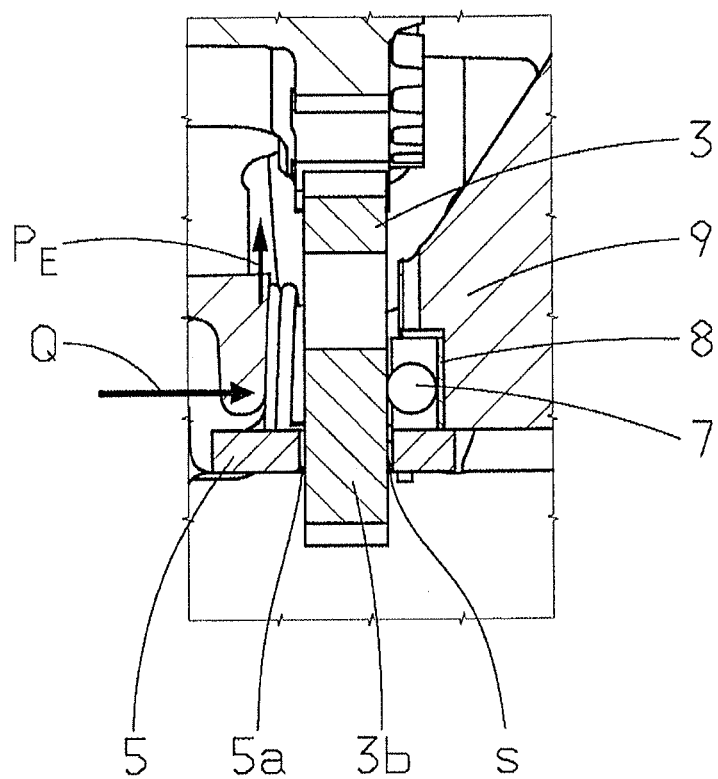
FIG. 2: a cross-section through the locking pawl, with ball guiding according to the invention.

FIG. 2 shows a section along the plane II-II in FIG. 1, i.e. a cross-section through the locking pawl 3 in the area of the pawl hook 3b, which extends through the guide slot 5a of the guide plate 5. The locking pawl 3 is acted upon by the locking detent u with a transverse force indicated by the arrow Q. On the other side of the locking pawl 3 relative to the force direction Q is arranged the rolling body in the form of a ball 7 in a sleeve 8, preferably a steel sleeve 8, the ball being guided transversely to the direction of the force Q. The steel sleeve 8 is preferably fixed to the guide plate 5 and/or to the transmission housing 9.

As soon as the parking lock gearwheel 2 has moved on from the tooth-on-tooth position shown in FIG. 1 so that the pawl tooth 3a can fall into a tooth gap 2b, the locking pawl 3 moves upward in FIG. 2, i.e. in the direction of the arrow $P_E$ (parking lock engaged). During this movement the locking pawl 3 acted upon by the transverse force Q is supported via the ball 7 and the steel sleeve 8 on the guide plate 5 or housing 9, so that a gap s is left open in the guide slot 5a. Thus, on the one hand a friction force on the locking pawl 3 caused by static or sliding friction, and on the other hand any tilting of the locking pawl 3 around an edge of the guide slot 5a, are avoided. Instead, according to the invention rolling movement takes place between the locking pawl 3 and the steel sleeve 8 by virtue of the ball 7, during which only rolling friction occurs, which only exerts a small resistance force on the locking pawl 3. Accordingly the locking pawl 3 can fall into the exposed tooth gap 2b of the parking lock gearwheel 2 relatively quickly and without delay (see FIG. 1). This increases the engagement reliability of the parking lock device.

FIG. 3 shows the locking pawl 3 and the guide plate 5 as viewed from beneath. The steel sleeve 8 in which the ball 7 is guided perpendicularly to the plane of the drawing is formed as an open, longitudinally slotted cylinder so that a point contact 10 exists between the locking pawl 3 and the ball 7. The steel sleeve 8 is partially supported on the transmission housing 9, which absorbs the transverse force Q (see FIG. 2).

Figure 6:
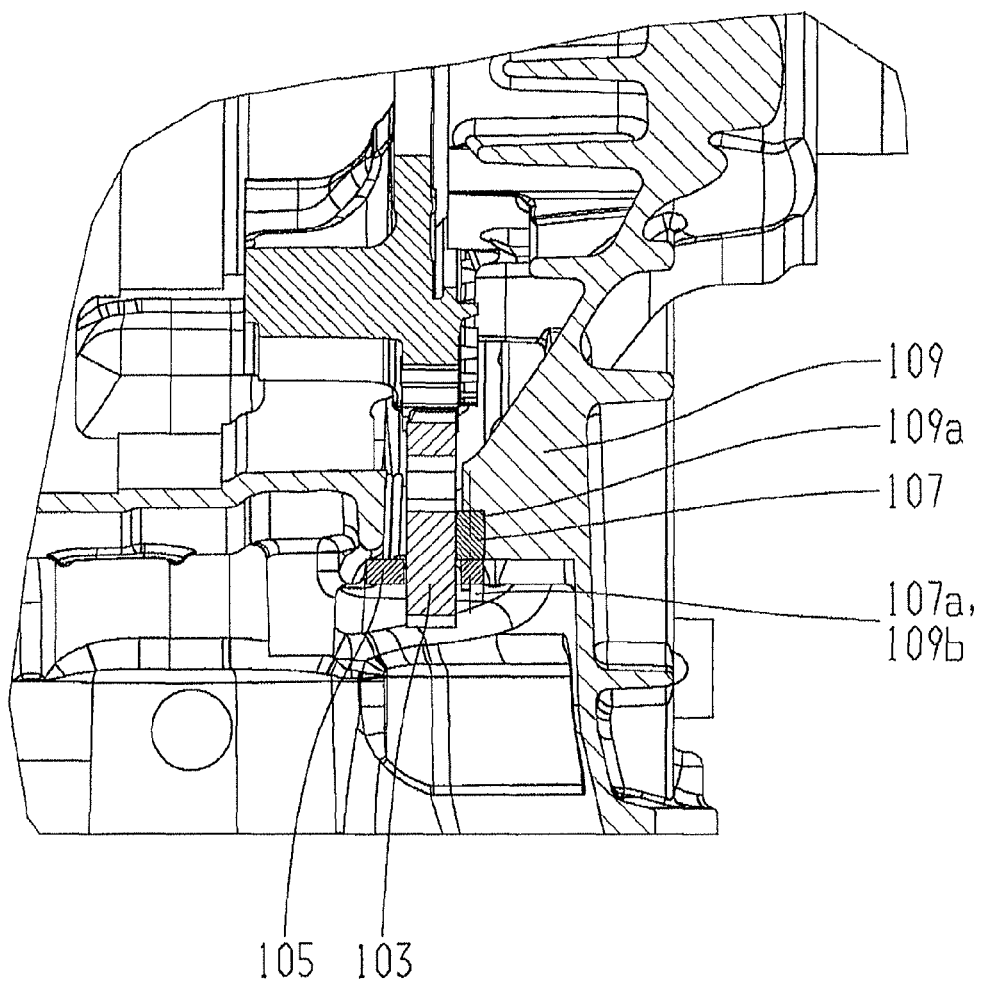

FIGS. 4, 5 and 6 show another example embodiment of the invention; for the same or analogous components, the same indexes as before are used but increased by 100.

FIG. 4 shows a view from beneath of a locking pawl 103, also referred to for brevity in what follows as the pawl 103, and a guide plate 105. Arranged on the guide plate 105 is a cylindrical or barrel-shaped insulating body 107, which is in contact with the pawl 103.

FIG. 5 shows a section along the plane V-V in FIG. 4. The pawl 103 is mounted fixed on the housing by a parking lock bolt 104 and comprises a pawl hook 103b, which projects through a guide slot in the guide plate 105. The locking pawl 103 has a pawl tooth 103a which, in this representation, is in a tooth-on-tooth position relative to a parking lock gearwheel 102 and its tooth 102a. The insulating body 107 has a longitudinal axis 107a which, for example in this case, is arranged perpendicularly to the surface of the guide plate 105 with which the insulating body 107 is in contact.

FIG. 6 shows a section in the plane VI-VI in FIG. 4. The insulating body 107 is held in a bore 109a of the transmission housing 109. The bore 109a has a longitudinal axis 109b which coincides with the longitudinal axis 107a of the insulating body 107. The bore 109a has a longitudinal slot 109c open toward the pawl 103, so that the ceramic body 107 forms a contact surface with the pawl 103. Thus, the insulating body 107 stands on the guide plate 105 and is held laterally and at the top by the bore 109a which forms a niche for it.

The function of the insulating body 107 is to insulate the pawl 103 as it contacts the guide plate 105, so that if there are charge differences between it and the transmission housing 109 and/or the guide plate 105, no discharge and spark formation can take place. Thus, the insulating body 107 has two functions, namely first to support the pawl 103 relative to the guide plate 105, and second to insulate the pawl 103 relative to the transmission housing 109.

In the example embodiment shown the insulating body 107 is a solid element made from an electrically non-conducting ceramic material. Alternatively the solid element can also be made from an electrically non-conducting or poorly-conducting plastic—in particular a Duroplast such as PEEK or TORLON. However, it is also possible to form the insulating body 107 as a hollow or main body with an electrically non-conducting or poorly-conducting coating. Such an electrically insulating coating would also prevent the transfer of electric charge and thus prevent any sparking. In the example embodiment shown, owing to the formation of the insulating body 107 as a cylindrical element there is linear contact with the pawl 103; if the element 107 is barrel-shaped, then there is a point contact with the flat outer face of the pawl 103. However, it would also be possible to make the insulating body 107 with a flat contact surface, so that a larger contact cross-section would be obtained which resulted in a lower current in the event of any charge transfer.

INDEXES

1 Parking lock device
2 Parking lock gearwheel
2a Tooth
2b Tooth gap
3 Locking pawl
3a Pawl tooth
3b Pawl hook
3c Supporting surface
4 Parking lock bolt
5 Guide plate
5a Guide slot
6 Lever spring
7 Ball (rolling body)
8 Steel sleeve
9 Transmission housing
10 Point contact 101 Parking lock device
102 Parking lock gearwheel
102a Tooth
103 Locking pawl
103a Pawl tooth
103b Pawl hook
104 Parking lock bolt
105 Guide plate
107 Supporting element/insulating body
109 Transmission housing
109a Bore in the transmission housing
109b Longitudinal axis of the bore
109c Longitudinal slot
a Axis of locking detent
s Gap
u Circumference of locking detent
$P_E$ Parking lock engage
Q Transverse force

The invention claimed is:

1. A parking lock device (1) for an automatic transmission of a motor vehicle, the parking lock device comprising:
   a locking pawl (3) being pivotally fixed to a housing and having a guiding element (3b),
   the guiding element (3b) projecting away from the locking pawl (3) and being spaced from a free end of the locking pawl (3),
   a guide plate (5) being fixed and supported by the housing,
   the guiding element (3b) of the locking pawl (3) being guided laterally in the guide plate (5), and
   one of (a) a low-friction supporting element (7, 8) and (b) an electrically insulating supporting element in a form of an insulating body (107) laterally guiding the locking pawl (3).

2. The parking lock device according to claim 1, wherein the lateral guiding of the locking pawl (3) is provided by the low-friction supporting element, and the locking pawl (3) is guided, in an area of the guiding element (3b), by the supporting element (7).

3. The parking lock device according to claim 2, wherein the guiding element is a pawl hook (3b).

4. A parking lock device (1) for an automatic transmission of a motor vehicle, the parking lock device comprising:
   a locking pawl (3) being pivotally fixed to a housing and having a guiding element (3b),
   a guide plate (5) being fixed and supported by the housing,
   the guiding element (3b) of the locking pawl (3) being guided laterally in the guide plate (5),
   a low-friction supporting element (7, 8) laterally guiding the locking pawl (3), and the low-friction supporting element (7, 8) being an electrically insulating body (107).

5. The parking lock device according to claim 4, wherein the insulating body (107) is made from either an electrically non-conducting or poorly-conducting material.

6. The parking lock device according to claim 5, wherein the insulating body (107) comprises a main body with either an electrically non-conducting or poorly-conducting coating.

7. The parking lock device according to claim 6, wherein the electrically non-conducting or poorly-conducting material is a ceramic material.

8. The parking lock device according to claim 6, wherein the electrically non-conducting or poorly-conducting material is a Duroplast.

9. The parking lock device according to claim 4, wherein the insulating body (107) is one of cylindrical shaped and barrel-shaped.

10. The parking lock device according to claim 9, wherein the insulating body (107) and the locking pawl (103) substantially contact one another at one of a point, along a line, and over an area.

11. The parking lock device according to claim 9, wherein the insulating body (107) has a longitudinal axis (107a) which extends perpendicular to the guide plate (105).

12. The parking lock device according to claim 9, wherein the insulating body (107) is arranged in a bore (109a) of the transmission housing (109), and the bore (109a) has a longitudinal axis (109b) arranged perpendicularly to the guide plate (105) and a longitudinal slot (109c) opens toward the locking pawl (103).

13. A parking lock device (1) for an automatic transmission of a motor vehicle, the parking lock device comprising:
   a locking pawl (3) being pivotally fixed to a housing and having a guiding element (3b),
   a guide plate (5) being fixed and supported by the housing,
   the guiding element (3b) of the locking pawl (3) being guided laterally in the guide plate (5),
   one of (a) a low-friction supporting element (7, 8) and (b) an electrically insulating supporting element, in a form of an insulating body (107), laterally guiding the locking pawl (3); and
   the lateral guiding of the locking pawl (3) is provided by the supporting element which comprises at least one rolling body (7).

14. The parking lock device according to claim 13, wherein the at least one rolling body is a ball (7).

15. The parking lock device according to claim 13, wherein the at least one rolling body is a cylindrical roller.

16. The parking lock device according to claim 13, wherein the at least one rolling body is barrel-shaped with rounded ends.

17. The parking lock device according to claim 13, wherein the at least one rolling body is guided in a cage (8).

18. The parking lock device according to claim 17, wherein the cage is a sleeve (8).

19. The parking lock device according to claim 17, wherein the cage (8) is attached to the guide plate (5).

20. The parking lock device according to claim 17, wherein the cage (8) is supported by the housing.

* * * * *